United States Patent
Chen et al.

(10) Patent No.: US 11,142,121 B2
(45) Date of Patent: Oct. 12, 2021

(54) INTERACTION METHOD AND APPARATUS OF MOBILE ROBOT, MOBILE ROBOT, AND STORAGE MEDIUM

(71) Applicant: Tencent Technology (Shenzhen) Company Limited, Shenzhen (CN)

(72) Inventors: Chao Chen, Shenzhen (CN); Wei Wu, Shenzhen (CN); Chengjun Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 169 days.

(21) Appl. No.: 16/597,484

(22) Filed: Oct. 9, 2019

(65) Prior Publication Data

US 2020/0039427 A1    Feb. 6, 2020

Related U.S. Application Data

(63) Continuation of application No. PCT/CN2018/109626, filed on Oct. 10, 2018.

(30) Foreign Application Priority Data

Oct. 31, 2017   (CN) .......................... 201711044804.1

(51) Int. Cl.
  *B60Q 1/50*   (2006.01)
  *G05B 19/042*  (2006.01)
  *G05D 1/02*   (2020.01)

(52) U.S. Cl.
  CPC .............. *B60Q 1/50* (2013.01); *B60Q 1/503* (2013.01); *G05B 19/042* (2013.01);
  (Continued)

(58) Field of Classification Search
  CPC ........ B60Q 1/50; B60Q 1/503; G05B 19/042; G05B 2219/25252; G05B 2219/25257; G05D 1/0212
  (Continued)

(56) References Cited

U.S. PATENT DOCUMENTS 10,336,242 B2 *   7/2019   Canonne ............. B60Q 1/0076
2006/0018701 A1   8/2006   Berman
(Continued)

FOREIGN PATENT DOCUMENTS

CN    101297177 A   10/2008
CN    101393029 A    3/2009
(Continued)

OTHER PUBLICATIONS

Chinese Office Action Issued in Chinese Patent Application 201711044804.1 dated Apr. 29, 2019, with concise English Translation, (12 pages).
(Continued)

*Primary Examiner* — Yazan A Soofi
(74) *Attorney, Agent, or Firm* — Oblon, McClelland, Maier & Neustadt, L.L.P.

(57) ABSTRACT

Aspects of the disclosure provide methods and mobile robots for providing information to a pedestrian. In some examples, a mobile robot includes processing circuitry. The processing circuitry obtains, via a sensor, sensing data that indicates an ambient environment of the mobile robot. The processing circuitry determines path indication information according to the sensing data. The path indication information includes a planned path of the mobile robot. The processing circuitry projects the path indication information on a target projection surface.

20 Claims, 8 Drawing Sheets

(52) U.S. Cl.
CPC . *G05D 1/0212* (2013.01); *G05B 2219/25252* (2013.01); *G05B 2219/25257* (2013.01); *G05D 2201/0213* (2013.01)

(58) Field of Classification Search
USPC .......................................................... 701/25
See application file for complete search history.

(56) References Cited

U.S. PATENT DOCUMENTS

| | | | | |
|---|---|---|---|---|
| 2015/0145701 | A1* | 5/2015 | Beggs | B60Q 1/26 340/944 |
| 2016/0055677 | A1 | 2/2016 | Kuffner | |
| 2016/0286627 | A1* | 9/2016 | Chen | F21S 8/086 |
| 2018/0118095 | A1* | 5/2018 | Kunii | G01C 21/365 |
| 2019/0056746 | A1* | 2/2019 | Jia | G05D 1/0236 |
| 2019/0278959 | A1* | 9/2019 | Engelke | G06Q 50/30 |

FOREIGN PATENT DOCUMENTS

| | | |
|---|---|---|
| CN | 102829788 A | 12/2012 |
| CN | 103245345 A | 8/2013 |
| CN | 103353758 A | 10/2013 |
| CN | 103888163 A | 6/2014 |
| CN | 203941451 U | 11/2014 |
| CN | 104376731 A | 2/2015 |
| CN | 104750448 A | 7/2015 |
| CN | 104842860 A | 8/2015 |
| CN | 104851146 A | 8/2015 |
| CN | 105929827 A | 9/2016 |
| CN | 105976457 A | 9/2016 |
| CN | 205706411 U | 11/2016 |
| CN | 106406312 A | 2/2017 |
| CN | 106471441 A | 3/2017 |
| CN | 106814738 A | 6/2017 |
| CN | 106864361 A | 6/2017 |
| CN | 106878687 A | 6/2017 |
| CN | 107139832 A | 9/2017 |
| CN | 108303972 A | 7/2018 |
| JP | 4962940 B2 | 6/2012 |
| TW | 200526441 A | 8/2005 |

OTHER PUBLICATIONS

Chinese Office Action Issued in Chinese Patent Application 201711044804.1 dated Jul. 17, 2019, with concise English Translation, (13 pages).

Chinese Office Action Issued in Chinese Patent Application 201711044804.1 dated Sep. 25, 2019, with concise English Translation, (13 pages).

International Search Report Issued in International Application No. PCT/CN2018/109626 dated Jan. 21, 2019, with English Machine Translation, (7 pages).

Written Opinion Issued in International Application No. PCT/CN2018/109626 dated Jan. 21, 2019 (4 pages).

* cited by examiner

North

INTERACTION METHOD AND APPARATUS OF MOBILE ROBOT, MOBILE ROBOT, AND STORAGE MEDIUM

RELATED APPLICATION

This application is a continuation of International Application No. PCT/CN2018/109626, filed on Oct. 10, 2018, which claims priority to Chinese Patent Application No. 201711044804.1, filed on Oct. 31, 2017, and entitled "INTERACTION METHOD AND APPARATUS OF MOBILE ROBOT". The entire disclosures of the prior applications are hereby incorporated by reference in their entirety.

FIELD OF THE TECHNOLOGY

Embodiments of this application relate to the field of artificial intelligence technologies.

BACKGROUND OF THE DISCLOSURE

A mobile robot (or robot) is a machine apparatus that executes work automatically. The mobile robot may transmit indication information to a user through a signal light, a loudspeaker, and other devices.

In the related technology, an information prompt of a mobile robot is mainly implemented in a voice form. For example, the mobile robot receives an instruction from a person through a microphone, determines prompt information corresponding to the instruction, and transmits a prompt sound to the person through a loudspeaker. The prompt sound is used for describing information content of the prompt information for the person.

In the foregoing method, the prompt information is transmitted through a prompt sound. Because the prompt sound is affected by many factors such as a distance between the person and the mobile robot, an ambient sound, and a regional characteristic of a language, it is difficult for the mobile robot to describe the prompt information to the person quickly and precisely. Currently, a more effective interaction method of a mobile robot is not available yet.

SUMMARY

Aspects of the disclosure provide methods and mobile robots for providing information to a pedestrian. In some examples, a mobile robot includes processing circuitry. The processing circuitry obtains, via a sensor, sensing data that indicates an ambient environment of the mobile robot. The processing circuitry determines path indication information according to the sensing data. The path indication information includes a planned path of the mobile robot. The processing circuitry projects the path indication information on a target projection surface.

According to aspects of the disclosure, the processing circuitry projects the path indication information on the target projection surface in a first projection form that includes at least one of a text, an image, an animation, or a video.

In an embodiment, the processing circuitry determines a projection color of the path indication information according to a color of the target projection surface. The projection color is different from the color of the target projection surface. The processing circuitry projects the path indication information on the target projection surface in the projection color.

In an embodiment, the processing circuitry projects the path indication information on the target projection surface in a form of an animation guide arrow.

In an embodiment, the processing circuitry determines a projection area on the target projection surface according to a location of an obstacle. The projection area has no overlapping area with the location of the obstacle. The processing circuitry projects the path indication information on the projection area.

According to aspects of the disclosure, the processing circuitry determines auxiliary indication information according to the sensing data. The auxiliary indication information includes at least one of an estimated arrival time and a movement speed of the mobile robot.

In an embodiment, the processing circuitry projects the path indication information and the auxiliary indication information on the target projection surface.

In another embodiment, the processing circuitry projects the path indication information on the target projection surface in a second projection form that is indicative of the auxiliary indication information.

In an embodiment, when the auxiliary indication information includes the estimated arrival time of the mobile robot, the processing circuitry projects, on the target projection surface, the path indication information in the projection color with a linear gradient according to the estimated arrival time of the mobile robot.

In an embodiment, when the auxiliary indication information includes the movement speed of the mobile robot, the processing circuitry determines a movement distance of the mobile robot in a predetermined time period according to the movement speed of the mobile robot, and projects the path indication information on the target projection surface according to the movement distance.

According to aspects of the disclosure, the processing circuitry determines whether the sensing data meets a predetermined condition.

In some embodiments, the sensing data includes at least one of a first location of a moving obstacle, a planned path of the moving obstacle, gesture information of the moving obstacle, a second location of a static obstacle, a type of the static obstacle, or a color of the target projection surface.

Aspects of the disclosure also provide one or more non-transitory computer-readable mediums storing instructions which when executed by at least one processor cause the at least one processor to perform any one of a combination of the methods.

Technical solutions provided in the embodiments of this application achieve at least the following beneficial effects.

A mobile robot obtains sensing data indicating an ambient environment (e.g., ambient environment data) where the mobile robot locates, determines a planned path of the mobile robot according to the sensing data, and projects and displays path prompt information (e.g., path indication information), which includes the planned path of the mobile robot, on a target projection plane (e.g., a target projection surface). In this way, a planned path along which a mobile robot is going to move can be projected and displayed on the target projection plane, so that a pedestrian nearby can directly see the planned path along which the mobile robot is going to move on the target projection plane, thus avoiding many restrictions due to a voice form in the related technology, and helping the mobile robot provide indication information for the pedestrian quickly and precisely.

BRIEF DESCRIPTION OF THE DRAWINGS

To describe the technical solutions in the embodiments of this application more clearly, the following briefly introduces the accompanying drawings required for describing the embodiments. The accompanying drawings in the following description show some embodiments of this application, and persons of ordinary skill in the art may still derive other drawings from these accompanying drawings.

DESCRIPTION OF EMBODIMENTS

Figure 1:
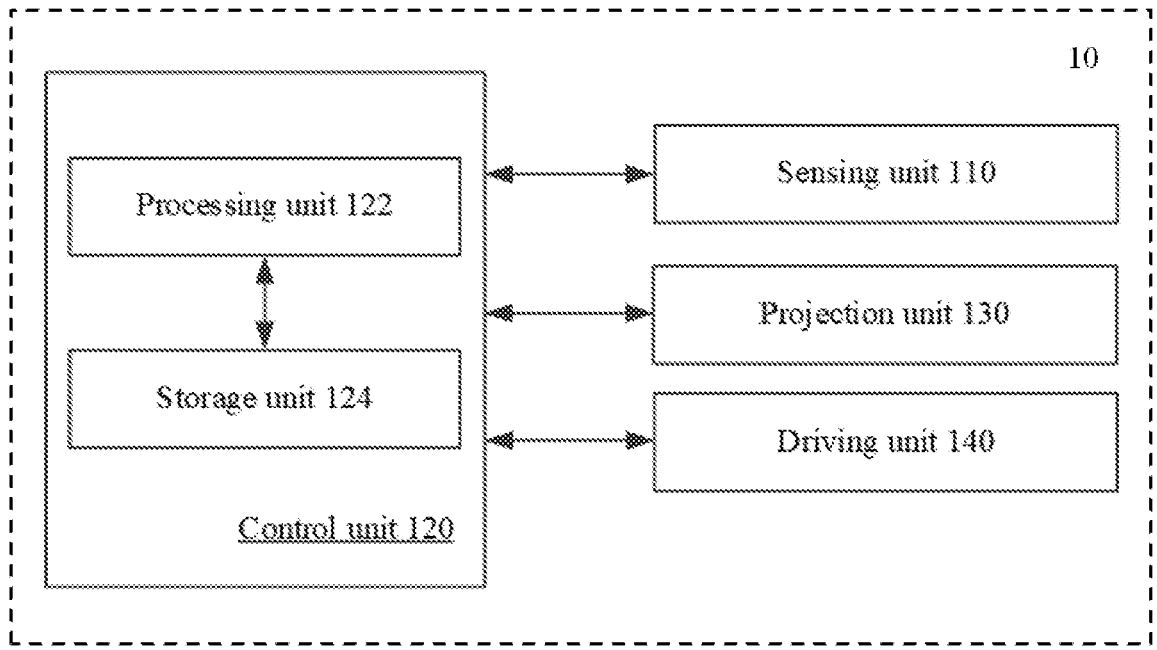
FIG. 1 is a structural block diagram of a mobile robot 10 according to an embodiment of this application.

To make the objectives, technical solutions and advantages of this application clearer, the following describes the implementations of this application in further detail with reference to the accompanying drawings.

For ease of understanding, terms appearing in the embodiments of this application are introduced in the following.

Mobile robot: A mobile robot is a robot system with a movement function.

In some embodiments, according to different movement manners, the mobile robot includes at least one of the following types: a wheeled mobile robot, a walking mobile robot (single-leg type, double-leg type, and multi-leg type), a tracked mobile robot, a crawling mobile robot, a squirming mobile robot, and a swimming mobile robot. The wheeled mobile robot includes an autonomous car or a driver-less car.

In some embodiments, according to other classification methods, mobile robots may also be classified into the following types of mobile robots. For example, according to different working environments, mobile robots include indoor mobile robots and outdoor mobile robots. For another example, according to different control system structures, mobile robots include functional (horizontal) structure mobile robots, behavioral (vertical) structure mobile robots, and hybrid mobile robots. For another example, according to different functions and purposes, mobile robots include medical mobile robots, military mobile robots, mobile robots for aiding the disabled, cleaning mobile robots, and the like. Types of the mobile robots are not limited in the embodiments of this application.

Sensing data: Sensing data includes data related to a mobile robot and data related to an ambient object during movement of the mobile robot.

In some embodiments, the data related to the mobile robot during movement of the mobile robot includes at least one of a travel location, acceleration, an angular velocity, an inclination angle, and a traveled distance of the mobile robot. The data related to an ambient object during movement of the mobile robot includes at least one of a first location of a moving obstacle, a planned path of the moving obstacle, gesture information of the moving obstacle, a second location of a static obstacle, a type of the static obstacle, and a plane color of a target projection plane (e.g., a target projection surface).

In some embodiments, the sensing data is data acquired through a sensing component during movement of the mobile robot.

The sensing data may be a travel location of the mobile robot acquired through a camera, or an acceleration and/or an inclination angle of the mobile robot acquired through a tri-axial accelerometer, or an angular velocity and/or an inclination angle of the mobile robot acquired through a gyroscope, or a traveled distance of the mobile robot acquired through an odometer, or a distance between the mobile robot and an ambient object acquired through a Laser Distance Sensor (LDS), or a distance between the mobile robot and an ambient object acquired through a cliff sensor.

In some embodiments, the data related to the mobile robot includes at least one of a current location, a movement speed, and a movement distance of the mobile robot. The data related to an ambient object includes at least one of a location of an obstacle, a type of the obstacle, and road surface quality, and is used for indicating an ambient environment during movement of the mobile robot.

The road surface quality is used for indicating a road surface basic condition of a road where the mobile robot is located. The road surface basic condition includes at least one of the following: whether there is a pit, whether there is water, and whether there is a deep well.

The obstacle includes: a static obstacle and/or a moving obstacle. There may be one or more static obstacles, and there may be one or more moving obstacles. This embodiment does not limit the quantities and types of the static obstacles and the moving obstacles.

The static obstacle may be furniture, a home appliance, an office device, a brick wall, a wood wall, an electric wire on the floor, a door threshold between rooms, and the like. The moving obstacle includes a person, a moving vehicle, other mobile robots, and the like. In the following embodiments, the moving obstacle being a person is taken as an example for description.

Prompt information (or indication information): The prompt information is information that is determined according to the sensing data and that needs to be projected and displayed. In the embodiments of this application, the prompt information includes path prompt information (e.g., path indication information). The path prompt information includes a planned path of the mobile robot. The planned path of the mobile robot is a planned movement path of the mobile robot.

In some embodiments, the prompt information further includes auxiliary prompt information (e.g., auxiliary indication information). The auxiliary prompt information includes an estimated arrival time and/or a movement speed of the mobile robot. The estimated arrival time of the mobile robot is an estimated time for reaching a target location when the mobile robot moves on the planned path. The movement speed is a speed of the mobile robot when moving on the planned path.

Referring to FIG. 1, FIG. 1 is a structural block diagram of a mobile robot according to an exemplary embodiment of this application. The mobile robot 10 includes a sensing unit 110, a control unit 120, a projection unit 130, and a driving unit 140.

The sensing unit 110 is configured to acquire sensing data of the mobile robot 10 in a movement area through a sensing component. The sensing data includes: data related to the mobile robot 10 and data related to an ambient object during movement of the mobile robot 10.

In some embodiments, the sensing component includes at least one of a camera, a tri-axial accelerometer, a gyroscope, an odometer, an LDS, an ultrasonic sensor, an infrared human body induction sensor, a cliff sensor, and radar. The camera may also be a monocular camera and/or a binocular camera. This application does not limit the quantity and types of the sensing components.

For example, the camera is configured to measure a travel location of the mobile robot 10. The tri-axial accelerometer is configured to obtain acceleration and/or an inclination angle of the mobile robot 10. The gyroscope is configured to obtain an angular velocity and/or an inclination angle of the mobile robot 10. The odometer is configured to obtain a traveled distance of the mobile robot 10. The LDS is usually disposed at the top of the mobile robot 10, and is configured to measure a distance between the mobile robot 10 and an ambient object by using laser. The ultrasonic sensor is usually disposed on a lateral side of the mobile robot 10, and is configured to measure a distance between the mobile robot 10 and an ambient object by using ultrasonic waves. The cliff sensor is usually disposed at the bottom of the mobile robot 10, and is configured to measure a distance between the mobile robot 10 and an ambient object by using infrared.

The sensing unit 110 is electrically connected to the control unit 120, and transmits the acquired sensing data to the control unit 110. Correspondingly, the control unit 120 receives the sensing data acquired by the sensing unit 110.

The control unit 120 includes a processing unit 122 and a storage unit 124. The control unit 120 controls an overall operation of the mobile robot 10 through the processing unit 122. The processing unit 122 is configured to determine path prompt information according to the sensing data, where the path prompt information includes a planned path of the mobile robot 10. The processing unit 122 is further configured to control the mobile robot 10 to project and display the path prompt information on a target projection plane. Optionally, the target projection plane is a floor or a wall in front of a movement area.

In some embodiments, the processing unit 122 is further configured to, after determining the planned path of the mobile robot 10, control the mobile robot 10 to move on the planned path in a predetermined movement mode.

The control unit 120 stores at least one instruction through the storage unit 124. The instructions include an instruction for determining path prompt information according to sensing data, an instruction for projecting and displaying the path prompt information on a target projection plane, an instruction for implementing movement on a planned path in a predetermined movement mode, and the like. The storage unit 124 is further configured to store sensing data of the mobile robot 10 during movement.

In some embodiments, the processing unit 122 includes a processor (e.g., processing circuitry). The storage unit 124 includes a memory (e.g., non-transitory computer-readable memory). The memory stores at least one instruction, at least one program segment, a code set or an instruction set. The at least one instruction, the at least one program segment, the code set or the instruction set is loaded and executed by the processor to implement the interaction method of the mobile robot 10 provided in various method embodiments below.

The control unit 120 is electrically connected to the projection unit 130. The projection unit 130 is configured to project and display the path prompt information on the target projection plane according to a control signal of the control unit 120.

The control unit 120 is electrically connected to the driving unit 140. In some embodiments, the driving unit 140 includes at least one driving wheel and a motor connected to each driving wheel. The driving unit 140 is configured to control a driving direction and a rotation speed of at least one driving wheel according to a control signal of the control unit 120.

In an exemplary embodiment, the control unit 120 may be implemented by processing circuitry such as one or more application-specific integrated circuits, a digital signal processor, a digital signal processing device, a programmable logic device, a field programmable gate array, a controller, a microcontroller, a microprocessor, or other electronic elements, and is configured to perform the interaction method of the mobile robot 10 in the embodiments of this application.

In an exemplary embodiment, a computer readable storage medium is further provided. The computer readable storage medium stores at least one instruction, at least one program segment, a code set or an instruction set. The at least one instruction, the at least one program segment, the code set or the instruction set is loaded and executed by a processor to implement the interaction method of the mobile robot 10 provided in various method embodiments above. For example, the computer readable storage medium may be non-transitory computer-readable storage medium such as read-only memory, a random access memory, a magnetic tape, a floppy disk, an optical data storage device, and the like.

Figure 2:
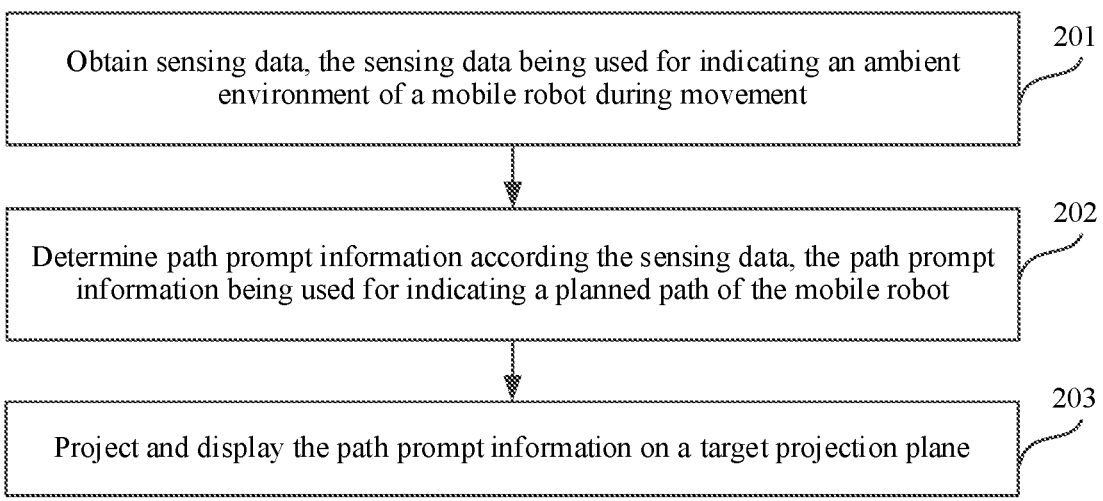
FIG. 2 is a flowchart of an interaction method of a mobile robot 10 according to an embodiment of this application.

Referring to FIG. 2, which is a flowchart of an interaction method of a mobile robot according to an embodiment of this application. This embodiment is described by using an example in which the method is applied to the mobile robot 10 shown in FIG. 1. The method includes the following steps:

Step 201: Obtain sensing data, the sensing data being used for indicating an ambient environment of the mobile robot 10 during movement.

In some embodiments, the mobile robot 10 obtains the sensing data through the foregoing sensing component. For example, the mobile robot 10 acquires image frames in real time through a camera, or acquires image frames through the camera at intervals of a predetermined time, and obtains sensing data according to the acquired image frames.

The predetermined time interval is set by the mobile robot 10 by default, or may be customized by a user, which is not limited in this embodiment.

This embodiment of this application does not limit the type of the sensing component used by the mobile robot 10. In the following, an example in which the mobile robot 10 acquires image frames through a camera and obtains sensing data according to the image frames is used for description.

In some embodiments, the sensing data includes at least one of: a first location of a moving obstacle, a planned path of the moving obstacle, gesture information of the moving obstacle, a second location of the static obstacle, a type of the static obstacle, a current location of the mobile robot 10, and a plane color of a target projection plane.

The planned path of the moving obstacle is an estimated movement path of the moving obstacle. The gesture information of the moving obstacle is information indicated by a gesture of the moving obstacle. The gesture information includes at least one of information for instructing the mobile robot 10 to stop, information for instructing the mobile robot 10 to give way, and information for instructing the mobile robot 10 to move towards a specified direction. For obtaining manners of various sensing data, reference may be made to the related descriptions in the following embodiments, and details are not described herein now.

Step 202: Determine path prompt information according to sensing data, the path prompt information including a planned path of the mobile robot 10.

The planned path of the mobile robot 10 is a path for indicating a planned movement direction of the mobile robot 10.

The planned path of the mobile robot 10 is a planned movement path of the mobile robot 10 in a preset time period, or a planned movement path corresponding to a preset movement length of the mobile robot 10.

For example, the preset time period is 5 seconds, and in this case, the planned path of the mobile robot 10 is a movement path of the mobile robot 10 in 5 seconds.

For another example, the preset length is 1 meter, and in this case, the planned path of the mobile robot 10 is a movement path corresponding to 1-meter movement of the mobile robot 10.

In some embodiments, the mobile robot 10 determines the planned path of the mobile robot 10 by using a first preset policy according to at least one of the following sensing data: the first location of the moving obstacle, the planned path of the moving obstacle, the second location of the static obstacle, and the gesture information of the moving obstacle, and generates path prompt information according to the planned path of the mobile robot 10. For the first preset policy, reference may be made to the related descriptions in the following embodiments, and details are not described herein now.

Step 203: Project and display the path prompt information on a target projection plane.

The target projection plane is a projection plane for projection and display of the path prompt information. For example, the target projection plane is a floor or a wall.

The target projection plane may be preset, or may be a projection plane dynamically determined by using a second preset policy according to the acquired sensing data. For example, the second preset policy includes: determining that the target projection plane is a floor if a distance between the second location of the static obstacle in the sensing data and the current location of the mobile robot 10 is greater than or equal to a first preset threshold; determining that the target projection plane is a wall if a distance between the second location of the static obstacle in the sensing data and the current location of the mobile robot 10 is less than the first preset threshold and there is a wall-type static obstacle within a preset range around the current location of the mobile robot 10. This embodiment does not limit the second preset policy. In the following, the target projection plane being a floor is used as an example for description.

The first preset threshold or the preset range is set by the mobile robot 10 by default, or customized by a user. For example, the first preset threshold is 1 meter, and the preset range is a circular range with the current location of the mobile robot 10 as the center of the circle and 1 meter as a radius.

Figure 3:
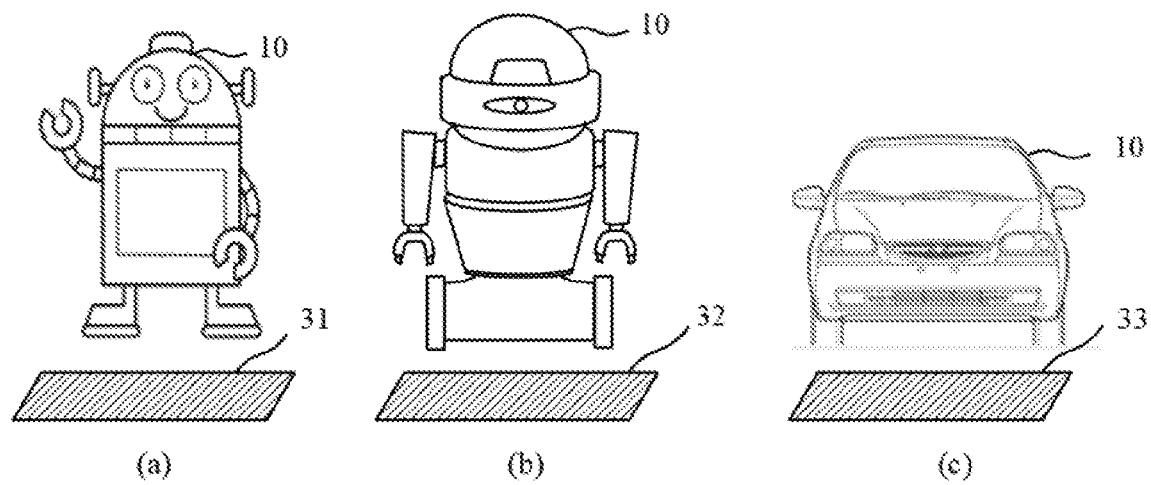
FIG. 3 is a schematic diagram of an interaction method of three different types of mobile robots 10 according to an embodiment of this application.

In an example, FIG. 3 shows schematic diagrams of interaction methods of three different types of mobile robots 10. As shown in FIG. 3(*a*), when the mobile robot 10 is a walking mobile robot, the path prompt information 31 is projected and displayed on the floor. As shown in FIG. 3(*b*), when the mobile robot 10 is a tracked mobile robot, the path prompt information 32 is projected and displayed on the floor. As shown in FIG. 3(*c*), when the mobile robot 10 is an autonomous car, the path prompt information 33 is projected and displayed on the floor. In the following embodiments, the mobile robot being a walking mobile robot is used as an example for description.

In some embodiments, the mobile robot 10 projects and displays the path prompt information on a target projection plane by, for example, projecting and displaying the path prompt information on the target projection plane in a first projection form. The first projection form includes at least one of a text projection form, an image projection form, an animation projection form, and a video projection mode.

In the following, the four possible projection forms above are introduced in sequence.

In the first possible projection form: the mobile robot 10 projects and displays the path prompt information on the target projection plane in a text projection form.

In some embodiments, the mobile robot 10 projects and displays text content on the target projection plane, and the text content is used for describing the planned path of the mobile robot 10.

Figure 4:
FIG. 4 is a schematic diagram of a projection form related to an interaction method according to an embodiment of this application.
Figure 4:
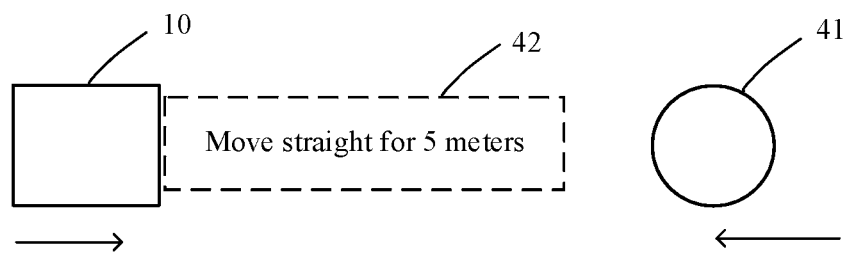

In an example, as shown in FIG. 4, the mobile robot 10 moves along the east direction, and a pedestrian 41 moves along the west direction. When the mobile robot 10 obtains sensing data that includes a first location of the pedestrian 41, the mobile robot 10 determines a planned path of the mobile robot 10 according to the sensing data. The mobile robot 10 generates text content 42 "move straight for 5 meters" according to the planned path of the mobile robot 10, and projects and displays the text content 42 on the floor, to describe the planned path of the mobile robot 10.

To facilitate description of the projection form used when the mobile robot 10 gives an information prompt, in the following examples, a top view of projecting and displaying the path prompt information on the target projection plane by the mobile robot 10 is taken as an example for description.

In the second possible projection form, the mobile robot 10 projects and displays the path prompt information on the target projection plane in an image projection form.

In some embodiments, the mobile robot 10 projects and displays the path prompt information in a form of a preset image. The preset image includes a rhombic image, a rectangular image, a circular image, an irregular polygonal image, and the like, which is not limited in this embodiment.

In some embodiments, the mobile robot 10 determines a projection color of the path prompt information according to a plane color of the target projection plane, and projects and displays the path prompt information on the target projection plane in a form of the projection color. The projection color is different from the plane color.

To avoid the problem of a poor information display effect due to the projection color of the path prompt information being the same as or similar to the plane color of the target projection plane, the mobile robot 10 obtains the plane color of the target projection plane in the sensing data, determines a projection color different from the plane color, where a color difference between the plane color and the projection color is higher than a preset difference threshold, and projects and displays the path prompt information on the target projection plane in a form of the projection color.

In some embodiments, the color difference between the plane color and the projection color is at least one of a difference degree of hue, saturation, and brightness between the plane color and the projection color.

In some embodiments, a correspondence between plane colors and projection colors is stored in the mobile robot 10 in advance. For example, the correspondence is as shown in Table 1, where the plane color "yellow" corresponds to the projection color "blue"; the plane color "green" corresponds to the projection color "red"; the plane color "white" corresponds to the projection color "brown".

TABLE 1

| Plane color | Projection color |
|---|---|
| Yellow | Blue |
| Green | Red |
| White | Brown |

For example, based on the correspondence provided in Table 1, if the plane color of the floor is yellow in the sensing data obtained by the mobile robot 10, the mobile robot 10 searches for the projection color "blue" corresponding to the plane color "yellow" in the stored correspondence, and projects and displays the path prompt information on the target projection plane in a form of a blue pattern.

In the third possible projection form, the mobile robot 10 projects and displays the path prompt information on the target projection plane in an animation projection form.

In some embodiments, the mobile robot 10 projects the path prompt information on the target projection plane in a form of an animation guide arrow. The animation guide arrow is used for indicating a movement direction of the mobile robot 10.

Figure 5:
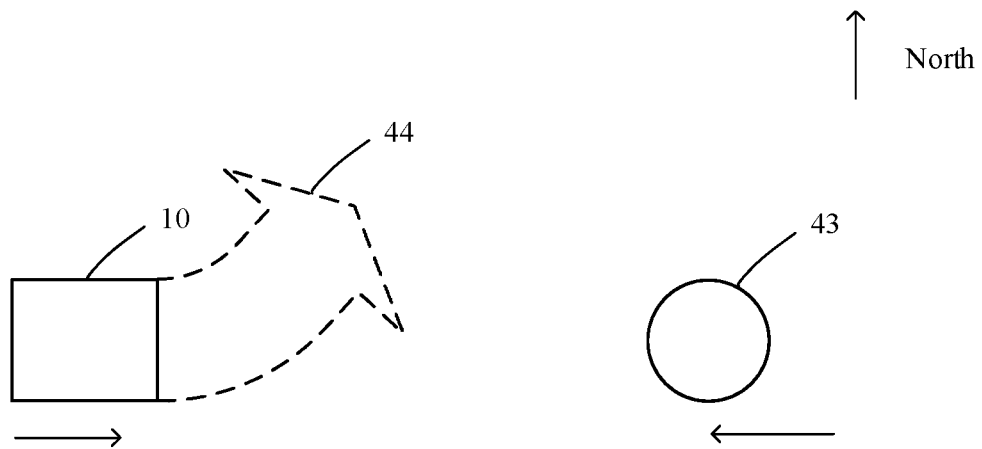
FIG. 5 is a schematic diagram of a projection form related to an interaction method according to an embodiment of this application.

In an example, as shown in FIG. 5, the mobile robot 10 moves along the east direction, and a pedestrian 43 moves along the west direction. When the mobile robot 10 obtains sensing data that includes a first location of the pedestrian 43, the mobile robot 10 determines path prompt information 44 according to the sensing data, and projects and displays the path prompt information 44 on the floor in a form of an animation guide arrow by using the width of the mobile robot 10 as a projection boundary, to prompt a planned path of the mobile robot 10 to the pedestrian 43.

The mobile robot 10 may not only project and display the path prompt information in the form of an animation guide arrow, but may also project and display the path prompt information on the target projection plane in other preset animation forms, which are not limited in this embodiment. In the following, the path prompt information being projected and displayed in the form of an animation guide arrow is used as an example for description.

In the fourth possible projection form, the mobile robot 10 projects and displays the path prompt information on the target projection plane in a video projection mode.

Because the path prompt information usually changes dynamically, the mobile robot 10 may project and display a dynamic video on the target projection plane. The dynamic video is used for indicating the planned path of the mobile robot 10.

In some embodiments, the mobile robot 10 presets a video size and/or resolution of the dynamic video.

It is understood that according to the foregoing projection forms that, any two of the four possible projection forms may be combined in implementation, or any three of the four possible projection forms may be combined in implementation, or all of the four possible projection forms may be combined in implementation. Implementations of combinations of the projection forms are not described in this embodiment of this application in detail again.

Before the path prompt information is projected and displayed on the target projection plane, the mobile robot 10 determines a projection area on the target projection plane according to a location of an obstacle. The projection area has no overlapping area with the location of the obstacle. After the projection area is determined, the mobile robot 10 projects and displays the path prompt information on the projection area.

In some embodiments, the mobile robot 10 projects and displays the path prompt information on the projection area of the target projection plane in any one or more of the foregoing projection forms.

To avoid the problem of a poor information display effect due to projection of the path prompt information onto the location of the obstacle, the mobile robot 10 obtains the location of the obstacle in the sensing data, so as to determine, in the target projection plane, a projection area that has no overlapping area with the location of the obstacle.

Figure 6:
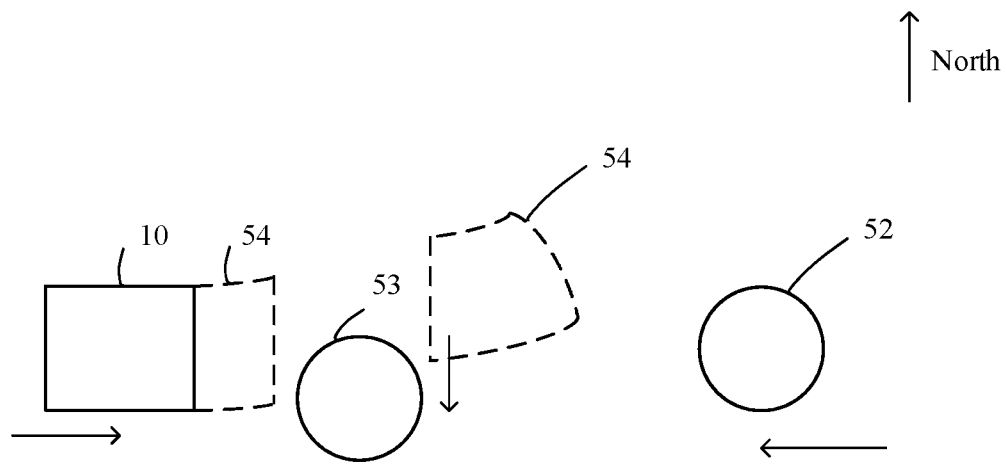
FIG. 6 is a schematic diagram of a projection form related to an interaction method according to an embodiment of this application.

In an example, as shown in FIG. 6, the mobile robot 10 moves along the east direction, a pedestrian 52 moves along the west direction, and a pedestrian 53 moves along the south direction. When the mobile robot 10 obtains sensing data that includes a first location of the pedestrian 52 and a first location of the pedestrian 53, the mobile robot 10 determines path prompt information 54 according to the sensing data, determines a projection area that has no overlapping area with the first location of the pedestrian 52 and the first location of the pedestrian 53, and projects and displays path prompt information 54 on the projection area.

In some embodiments, the width of the projection area is greater than or equal to the width of the mobile robot 10.

In conclusion, in this embodiment, a mobile robot obtains sensing data for indicating an ambient environment of the mobile robot during movement, determines a planned path of the mobile robot according to the sensing data, and projects and displays path prompt information, which includes the planned path of the mobile robot, on a target projection plane. In this way, a planned path along which a mobile robot is going to move can be projected and displayed on a target projection plane, so that a pedestrian nearby can directly see the planned path along which the mobile robot is going to move on the target projection plane, thus avoiding many restrictions due to a voice form in the related technology, and helping the mobile robot provide an information prompt for the pedestrian quickly and precisely.

In this embodiment, the path prompt information is further projected and displayed on the target projection plane in a first projection form, where the first projection form includes at least one of a text projection form, an image projection form, an animation projection form, and a video projection mode, so that the path prompt information is projected in diversified forms, thus improving an information display effect of the path prompt information.

To display more information of the mobile robot 10 during movement, the prompt information may further include auxiliary prompt information in addition to the path prompt information. The auxiliary prompt information includes: an estimated arrival time and/or a movement speed of the mobile robot 10. An interaction method based on path prompt information and auxiliary prompt information is described in the following exemplary embodiment.

Figure 7:
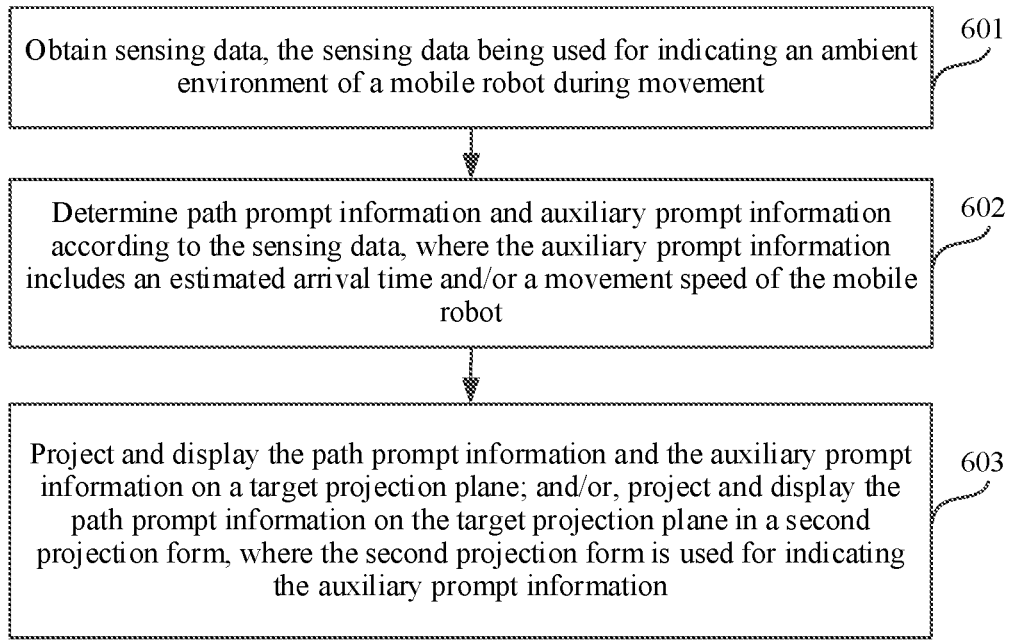
FIG. 7 is a flowchart of an interaction method of a mobile robot according to another embodiment of this application.

Referring to FIG. 7, which is a flowchart of an interaction method of a mobile robot 10 according to another embodiment of this application. In this embodiment, the method being applied to the mobile robot 10 shown in FIG. 1 is taken as an example for description. The method includes the following steps:

Step 601: Obtain sensing data, the sensing data being used for indicating an ambient environment of the mobile robot 10 during movement.

For example, a sensing component includes a camera. The mobile robot 10 obtains an $i^{th}$ image frame captured by the camera, and determines sensing data corresponding to the $i^{th}$ image frame according to the $i^{th}$ image frame. The camera shoots at a predetermined shooting rate, for example, 24 fps (that is, 24 frames per second), and i is a natural number.

The sensing data includes at least one of a first location of a moving obstacle, a planned path of the moving obstacle, gesture information of the moving obstacle, a second location of a static obstacle, a type of the static obstacle, a current location of the mobile robot 10, and a plane color of a target projection plane.

In some embodiments, the first location of the moving obstacle, the second location of the static obstacle, the type of the static obstacle, and the plane color of the target projection plane are all obtained by using a first obtaining policy. The planned path of the moving obstacle is obtained by using a second obtaining policy. The gesture information of the moving obstacle is obtained by using a third obtaining policy. The three obtaining policies are described in sequence below.

The first obtaining policy includes: The mobile robot 10 calculates an image feature according to the $i^{th}$ image frame by using a machine learning algorithm, and determines sensing data according to the calculated image feature.

The calculating, by the mobile robot 10, an image feature by using a machine learning algorithm includes, but is not limited to, the following two possible implementations:

In one possible implementation, the machine learning algorithm is a conventional machine learning algorithm, and the mobile robot 10 calculates the image feature of the $i^{th}$ image frame by using the conventional machine learning algorithm.

For example, the conventional machine learning algorithm is a target detection algorithm based on a Histogram of Oriented Gradient (HOG) feature and a Support Vector Machine (SVM) model.

In another possible implementation, the machine learning algorithm is a neural network algorithm. The mobile robot 10 inputs the $i^{th}$ image frame to a deep network, and extracts the image feature of the $i^{th}$ image frame through the deep network. The deep network is a neural network for extracting a feature from an inputted image frame to obtain an image feature of the image frame.

In some embodiments, the deep network include at least one of a Convolutional Neural Network (CNN) model, a Deep Neural Network (DNN) model, a Recurrent Neural Networks (RNN) model, an embedding model, a Gradient Boosting Decision Tree (GBDT) model, and a Logistic Regression (LR) model. For example, the deep network is Region-based Convolutional Neural Networks (RCNN).

The determining, by the mobile robot 10, sensing data according to the calculated image feature includes: estimating at least one of the following sensing data according to the calculated image feature and a predetermined camera parameter: the first location of the moving obstacle, the second location of the static obstacle, the type of the static obstacle, and the plane color of the target projection plane.

For example, if the moving obstacle is a pedestrian, the image feature of the $i^{th}$ image frame extracted by the mobile robot 10 through the deep network includes feet locations and/or a body size of the pedestrian, and the like. A distance between the pedestrian and the mobile robot 10 is estimated according to the obtained image feature and the predetermined camera parameter, thus obtaining the first location of the pedestrian.

The second obtaining policy includes: The mobile robot 10 obtains, according to at least two image frames acquired (including an $(i-m)^{th}$ image frame to an $i^{th}$ image frame), historical locations of the moving obstacle in the at least two image frames, and determines the planned path of the moving obstacle according to the at least two historical locations of the moving obstacle, where m is a positive integer less than i.

The third obtaining policy includes: The mobile robot 10 detects, according to an $i^{th}$ image frame acquired, a gesture of a moving obstacle by using a machine learning algorithm, and determines gesture information corresponding to the detected gesture when the detected gesture matches a stored gesture.

In some embodiments, a correspondence between gestures and gesture information is stored in the mobile robot 10 in advance. For example, the correspondence is as shown in Table 2. When the gesture is a first preset action, that is, none of the five fingers is bent and the palm faces the mobile robot 10, the corresponding gesture information is information for instructing the mobile robot 10 to stop. When the gesture is a second preset action, that is, the thumb points upward and other four fingers except the thumb are completely bent towards the palm, the corresponding gesture information is information for instructing the mobile robot 10 to give way. When the gesture is a third preset action, that is, the index points to a specified direction and other four fingers except the index are completely bent towards the palm, the corresponding gesture information is information for instructing the mobile robot 10 to move towards a specified direction.

TABLE 2

| Gesture | Gesture information |
| --- | --- |
| First preset action | Stop |
| Second preset action | Give way |
| Third preset action | Move towards a specified direction |

Based on the correspondence provided in Table 2, in an example, if the moving obstacle is a pedestrian, the mobile robot 10 detects, according to an $i^{th}$ image frame acquired, a gesture of the pedestrian by using a machine learning algorithm, sequentially compares the detected gesture with the stored gestures, and when the detected gesture matches the first preset action, determines that gesture information corresponding to the detected gesture is used for instructing the mobile robot 10 to stop.

Step 602: Determine path prompt information and auxiliary prompt information according to the sensing data, where the auxiliary prompt information includes an estimated arrival time and/or a movement speed of the mobile robot 10.

According to at least one of the following sensing data: the planned path of the moving obstacle, the second location of the static obstacle, and the gesture information of the moving obstacle, the mobile robot 10 determines a planned path of the mobile robot 10 by using a preset rule, and generates path prompt information according to the planned path of the mobile robot 10. For the process of determining the path prompt information, reference may be made to the related details in the foregoing embodiment, and details are not described herein again.

In some embodiments, when the gesture information of the moving obstacle includes respective gesture information corresponding to at least two moving obstacles, distances between the at least two moving obstacles and the mobile robot 10 are compared. Gesture information of the closest moving obstacle is determined as target gesture information, and path prompt information is generated according to the target gesture information.

In an example, based on the correspondence provided in Table 2, if the moving obstacle is a pedestrian, the mobile robot 10 detects, according to an $i^{th}$ image frame acquired, gestures of two pedestrians (a pedestrian A and a pedestrian B) by using a machine learning algorithm, where the gesture of the pedestrian A is the third preset action, and the gesture of the pedestrian B is the first preset action. Besides, a distance between the pedestrian A and the mobile robot 10 is less than a distance between the pedestrian B and the mobile robot 10. Therefore, the mobile robot 10 determines the gesture information corresponding to the third preset action of the pedestrian A as target gesture information, and determines path prompt information of the mobile robot 10 according to a specified direction indicated by the target gesture information.

In some embodiments, the mobile robot 10 determines an estimated arrival time and/or a movement speed of the mobile robot 10 as the auxiliary prompt information.

The movement speed of the mobile robot 10 may be preset or determined dynamically. The movement speed may be a constant speed or a variable speed. In the following, the movement speed of the mobile robot 10 being a dynamically determined constant speed is taken as an example for description.

The auxiliary prompt information includes the estimated arrival time of the mobile robot 10. The manner of determining, by the mobile robot 10, auxiliary prompt information according to the sensing data includes: determining the estimated arrival time of the mobile robot 10 according to the planned path of the mobile robot 10 and the movement speed of the mobile robot 10.

For example, the planned path of the mobile robot 10 is a path that uses the current location of the mobile robot 10 as a start point and that has a movement length of 3 meters, and the movement speed of the mobile robot 10 is 1 m/s. In this case, it is determined that it takes 3 seconds for the mobile robot 10 to arrive at a target location when the mobile robot 10 moves on the planned path, where the target location is an end point of the planned path.

The auxiliary prompt information includes the movement speed of the mobile robot 10, and the manner of determining, by the mobile robot 10, auxiliary prompt information according to the sensing data includes: determining, by the mobile robot 10, the movement speed of the mobile robot 10 by using a preset rule according to the planned path of the moving obstacle and the planned path of the mobile robot 10.

For example, the mobile robot 10 determines, according to the planned path of the moving obstacle and the planned path of the mobile robot 10, that the movement speed of the mobile robot 10 is 1 m/s by using a preset rule.

Step 603: Project and display the path prompt information and the auxiliary prompt information on a target projection plane; and/or, project and display the path prompt information on the target projection plane in a second projection form, where the second projection form is used for indicating the auxiliary prompt information.

In a possible implementation, the mobile robot 10 projects and displays the path prompt information and the auxiliary prompt information on the target projection plane.

While projecting and displaying the path prompt information on the target projection plane, the mobile robot 10 projects and displays the auxiliary prompt information on the target projection plane. For a projection form of the auxiliary prompt information, reference may be made to the three possible projection forms of the path prompt information in the foregoing embodiment, and details are not described herein again.

Figure 8:
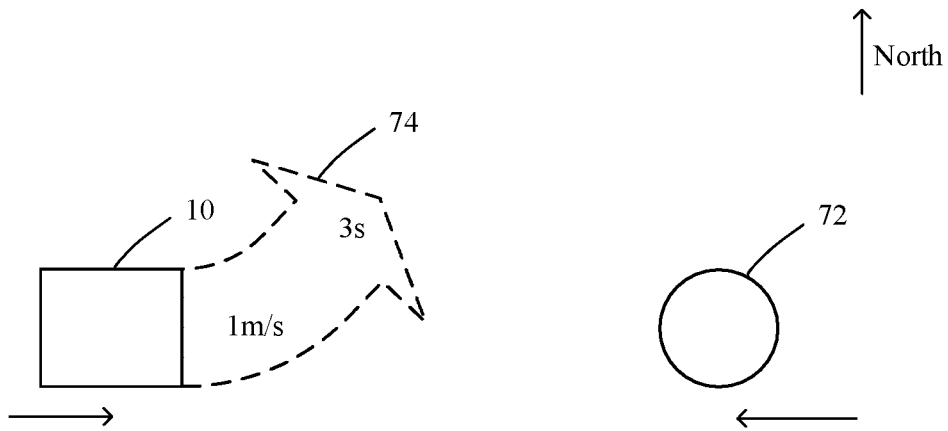
FIG. 8 is a schematic diagram of a projection form related to an interaction method according to an embodiment of this application.

In an example, as shown in FIG. 8, the mobile robot 10 moves along the east direction, and a pedestrian 72 moves along the west direction. After the mobile robot 10 determines path prompt information 74 according to obtained sensing data, the mobile robot 10 projects and displays the path prompt information 74 on the target projection plane, and at the same time, projects and displays an estimated arrival time "3 s" and/or a movement speed "1 m/s" of the mobile robot 10 on the floor.

In another possible implementation, the mobile robot 10 projects and displays the path prompt information on the target projection plane in a second projection form, where the second projection form is used for indicating the auxiliary prompt information.

In some embodiments, the auxiliary prompt information includes the estimated arrival time of the mobile robot 10, and the projecting and displaying the path prompt information on the target projection plane in a second projection form includes: implementing linear gradient on the projection color of the path prompt information according to the estimated arrival time of the mobile robot 10; and projecting and displaying, on the target projection plane, the path prompt information after the linear gradient.

The path prompt information after the linear gradient includes n color saturations in descending order of the same projection color, and the n color saturations are positively correlated to the estimated arrival time of the mobile robot, where n is a positive integer. The color saturation is also referred to as saturation, and is used for indicating the purity of the color.

That is, the mobile robot 10 implements linear gradient on the projection color of the path prompt information in descending order of the n color saturations, to obtain the path prompt information after the linear gradient. In some embodiments, a value range of the n color saturations is 0 to 1.

The positive correlation between the n color saturations and the estimated arrival time of the mobile robot includes: a higher color saturation of the projection color, that is, higher brightness of the projection color, indicates a shorter estimated arrival time of the mobile robot.

For example, color saturation "1" is used for indicating a first estimated arrival time of the mobile robot 10, and color saturation "0" is used for indicating a second estimated arrival time of the mobile robot 10. Because the color saturation "1" is higher than the color saturation "0", the first estimated arrival time is shorter than the estimated arrival time.

Figure 9:
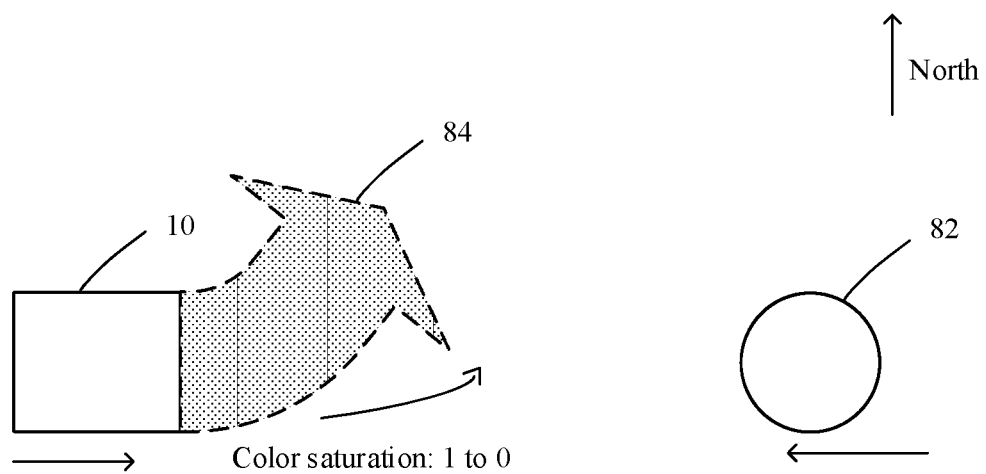
FIG. 9 is a schematic diagram of a projection form related to an interaction method according to an embodiment of this application.

In an example, as shown in FIG. 9, the mobile robot 10 moves along the east direction, and a pedestrian 82 moves along the west direction. After determining path prompt information according to obtained sensing data, the mobile robot 10 implements linear gradient on a projection color "brown" of the path prompt information to obtain path prompt information 84 after the linear gradient, and projects and displays, on the target projection plane, the path prompt information 84 after the linear gradient.

In some embodiments, the auxiliary prompt information includes the movement speed of the mobile robot 10, the projecting and displaying, by the mobile robot 10, the path prompt information on the target projection plane in a second projection form includes: determining a movement length of the mobile robot 10 in a predetermined time period according to the movement speed of the mobile robot 10, and projecting and displaying the path prompt information on the target projection plane by using the movement length as a projection length of the path prompt information.

The projection length is used for indicating the movement speed of the mobile robot 10. A longer projection length indicates a higher movement speed of the mobile robot 10.

Figure 10:
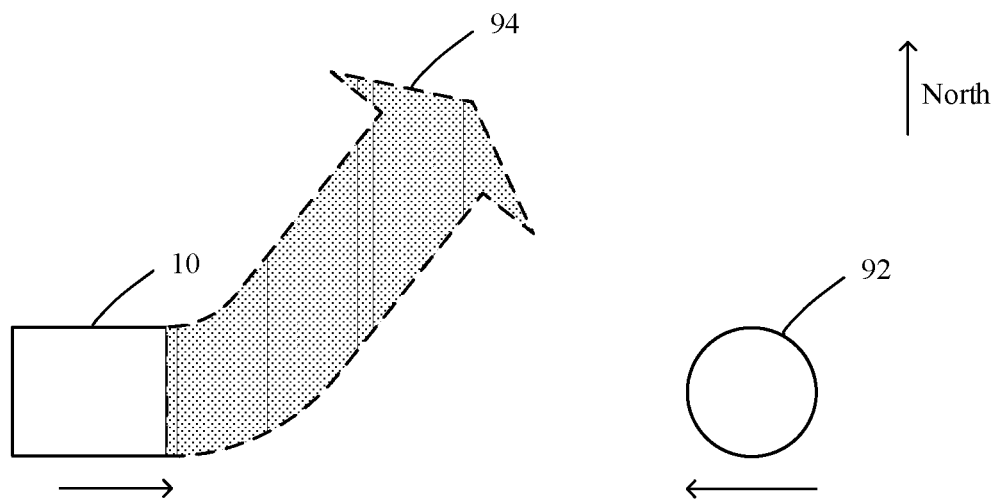
FIG. 10 is a schematic diagram of a projection form related to an interaction method according to an embodiment of this application.

In an example, as shown in FIG. 10, the mobile robot 10 moves along the east direction, and a pedestrian 92 moves along the west direction. After the mobile robot 10 determines a planned path of the mobile robot 10 according to obtained sensing data, the mobile robot 10 determines, according to a movement speed "1 m/s", a movement length "5 m" of the mobile robot 10 in a predetermined time period "5 s", and projects and displays the path prompt information 94 with a length of 5 m on the floor.

In conclusion, in this embodiment, according to a location of an obstacle, a projection area that has no overlapping area with the location of the obstacle is determined, and the path prompt information is projected and displayed on the projection area, thus avoiding the problem of a poor information display effect due to projection of the path prompt information onto the location of the obstacle, so that the interaction method of a mobile robot has a good information display effect.

In this embodiment, according to a plane color of the target projection plane, a projection color different from the plane color is determined, and the path prompt information is projected and displayed on the target projection plane in a form of the projection color, thus avoiding the problem of a poor information display effect due to the projection color of the path prompt information being the same as or similar to the plane color of the target projection plane, and improving the information display effect.

In this embodiment, the path prompt information is further projected and displayed on the target projection plane in a second projection form, where the second projection form is used for indicating the auxiliary prompt information, so that the mobile robot can further provide the auxiliary prompt information for a pedestrian while providing the path prompt information for the pedestrian, thus enriching the content of the prompt information.

Figure 11:
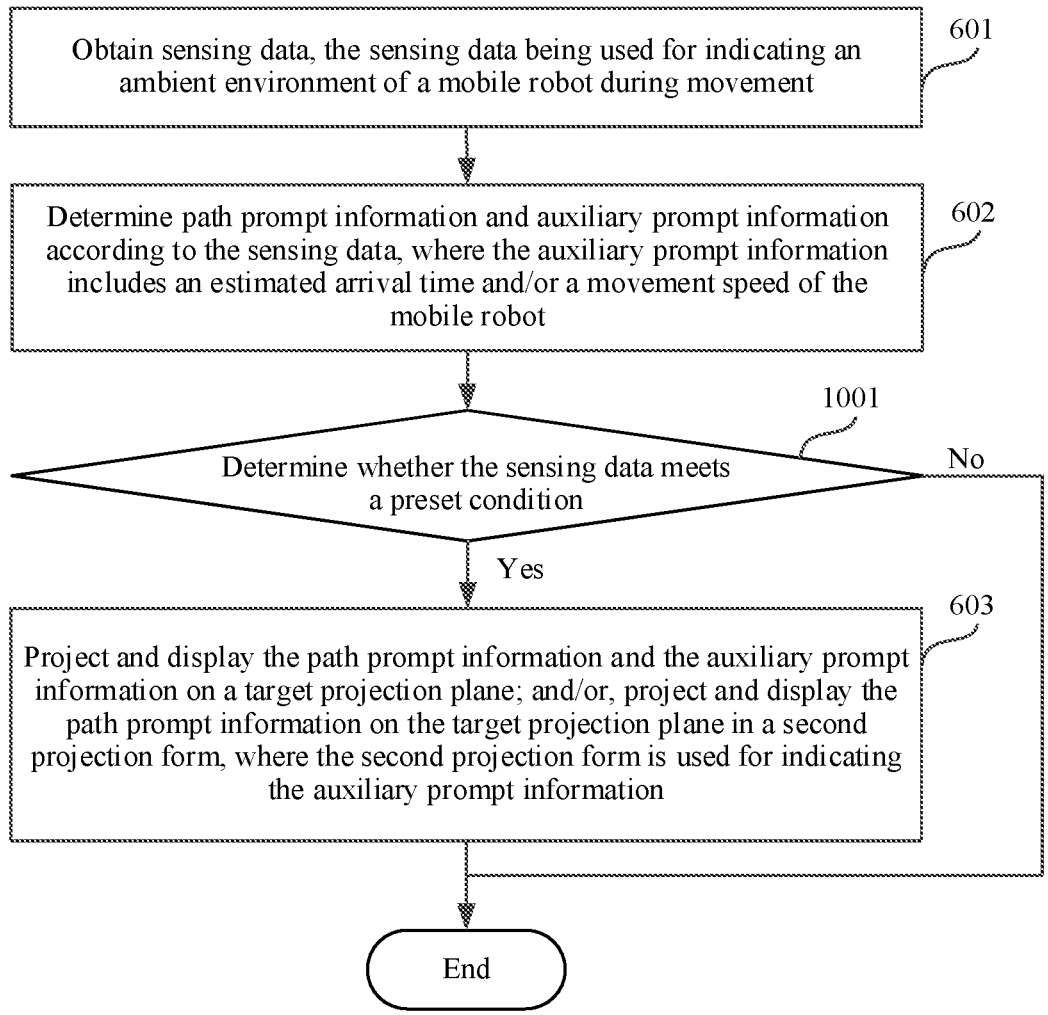
FIG. 11 is a flowchart of an interaction method of a mobile robot according to another embodiment of this application.

In some embodiments, before step 203 or 603, the interaction method of the mobile robot 10 further includes: determining, by the mobile robot 10, whether the sensing data meets a predetermined condition; and determining to start projection if the sensing data meets the predetermined condition, and performing step 203 or 603. In the following, the method further including this step before step 603 is taken as an example for description. Referring to FIG. 11:

Step 1001: The mobile robot 10 determines whether the sensing data meets a predetermined condition.

To reduce energy consumption of the mobile robot 10 due to real-time projection and display, before the mobile robot 10 starts projection, it is first determined whether the sensing data meets a predetermined condition. If the sensing data meets the predetermined condition, it is determined to start projection, and step 603 is performed. If the sensing data does not meet the predetermined condition, it is determined that projection is not required, and the process is ended.

The predetermined condition includes: a distance between the first location of the moving obstacle and a current location of the mobile robot 10 is less than a predetermined threshold, and/or, the type of the static obstacle is an obstacle type meeting a visual blind spot condition. The predetermined threshold may be any value from 0 to N meters, and N is a positive integer. This embodiment does not limit the value of the predetermined threshold.

When the mobile robot 10 passes through some particular intersections, due to blocking of a static obstacle, there may be a large blind area between the mobile robot 10 and the moving obstacle. To avoid a collision, it is determined to start projection if the type of the static obstacle in the sensing data obtained by the mobile robot 10 is an obstacle type meeting the visual blind spot condition.

In some embodiments, the obstacle type meeting the visual blind spot condition includes at least one of an obstacle at an entrance/exit, an obstacle at a crossroad, an obstacle at an intersection, or an obstacle at the corner.

In some embodiments, if the type of the static obstacle in the sensing data obtained by the mobile robot 10 is an obstacle type meeting the visual blind spot condition, it is determined to start projection, to project and display the path prompt information and the auxiliary prompt information on the floor in a form of a particular alarm image.

For example, the particular alarm image is a zebra crossing image. This embodiment does not limit the form of the particular alarm image.

In some embodiments, while projecting and displaying the path prompt information and the auxiliary prompt information on the floor, the mobile robot 10 generates a sound signal for indicating.

In some embodiments, while the path prompt information and the auxiliary prompt information are projected and displayed on the floor, a prompt identifier is projected and displayed on the wall, where the prompt identifier is used for indicating that the mobile robot 10 is going to pass by within a preset time period.

For example, the prompt identifier is an inverted-triangle identifier, and the identifier includes a text "caution".

Figure 12:
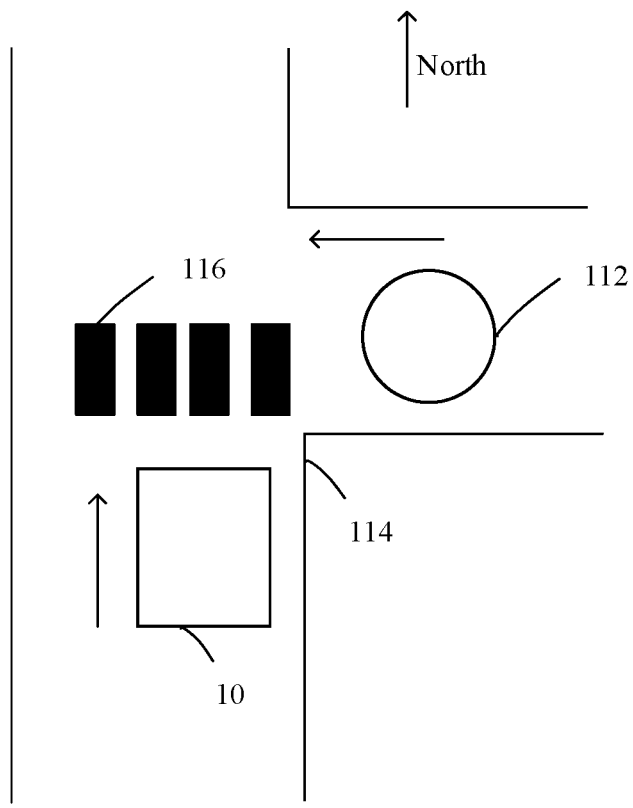
FIG. 12 is a schematic diagram of a projection form related to an interaction method according to an embodiment of this application.

In an example, as shown in FIG. 12, the mobile robot 10 moves along the north direction, and a pedestrian 112 moves along the west direction. The mobile robot 10 determines a planned path of the mobile robot 10 according to obtained sensing data, determines that the sensing data meets a predetermined condition when the obtained sensing data includes a wall 114 at the intersection, and determines to start projection to project and display the path prompt information and the auxiliary prompt information on the floor in a form of a particular alarm image 116.

In conclusion, in this embodiment, before the mobile robot 10 starts projection, it is first determined whether the sensing data meets a predetermined condition, and projection is started if the sensing data meets the predetermined condition, thus avoiding the problem of energy consumption of the mobile robot 10 due to real-time projection and display, and greatly reducing energy consumption of the mobile robot 10.

In this embodiment, if the type of the static obstacle in the sensing data obtained by the mobile robot 10 is an obstacle type meeting the visual blind spot condition, it is determined to start projection. Therefore, when the mobile robot 10 passes through some particular intersections, that is, when there is a large blind area between the mobile robot and a pedestrian due to blocking of the static obstacle, by means of projection and display on the target projection plane, the mobile robot 10 can provide an information prompt for the pedestrian who cannot observe the mobile robot, thus greatly reducing a collision risk.

An apparatus embodiment of this application is provided below, which can be configured to perform the method embodiment of this application. For details not disclosed in the apparatus embodiment of this application, refer to the method embodiment of this application.

Figure 13:
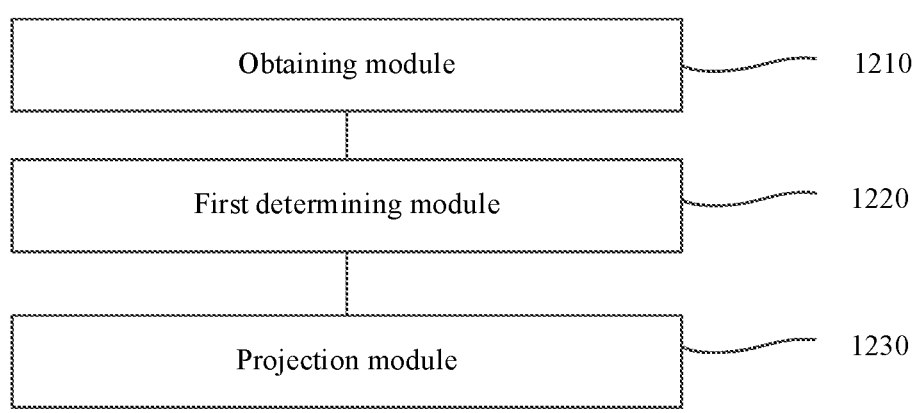
FIG. 13 is a schematic structural diagram of an interaction apparatus of a mobile robot according to an embodiment of this application.

Referring to FIG. 13, which is a schematic structural diagram of an interaction apparatus of a mobile robot according to an embodiment of this application. The interaction apparatus may be implemented as all or a part of the mobile robot by using a dedicated hardware circuit or a combination of software and hardware. The interaction apparatus includes: an obtaining module 1210, a first determining module 1220, and a projection module 1230.

The obtaining module 1210 is configured to implement the foregoing step 201 or 601.

The first determining module 1220 is configured to implement the foregoing step 202.

The projection module 1230 is configured to implement the foregoing step 203.

Figure 14:
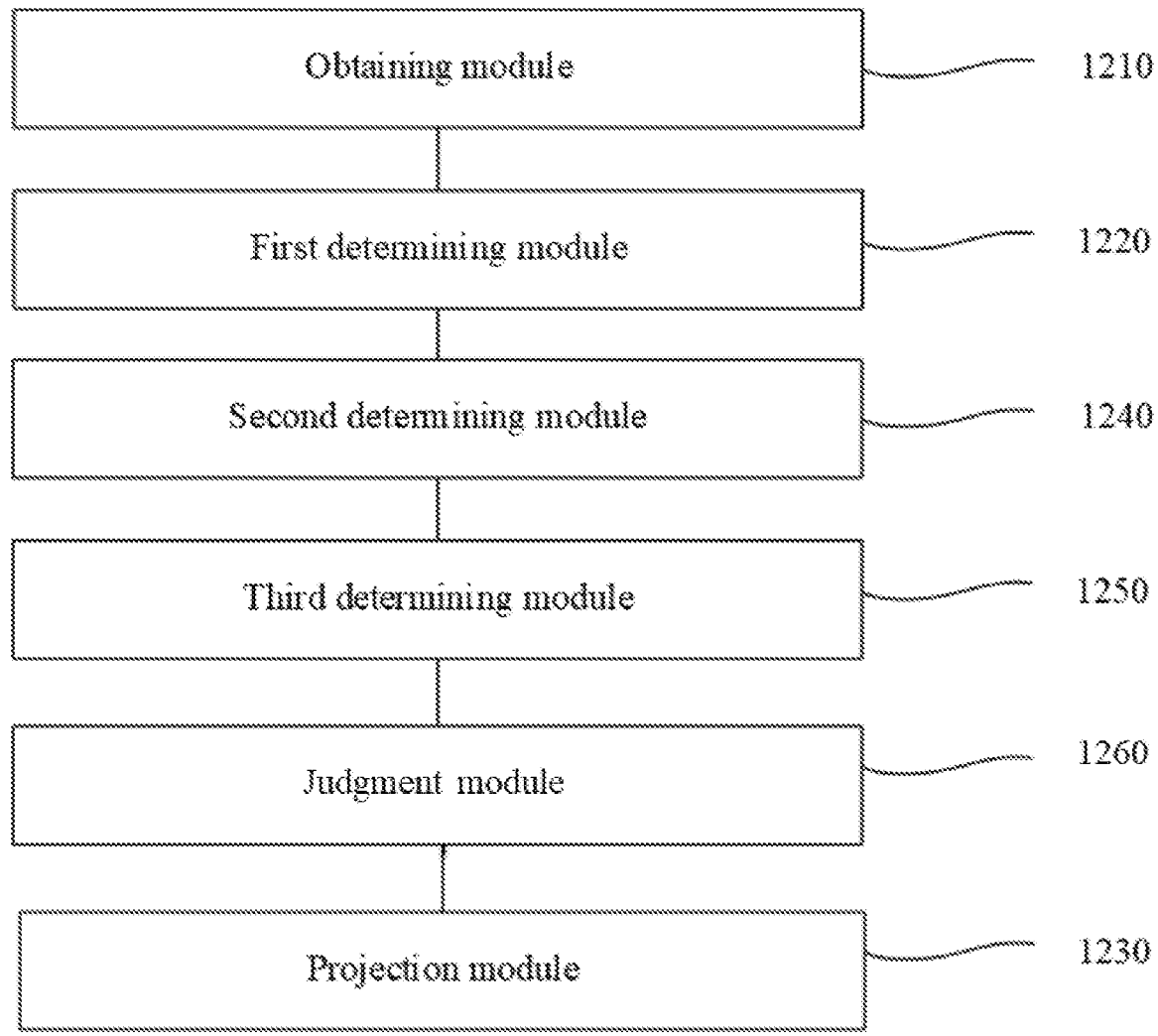
FIG. 14 is a schematic structural diagram of an interaction apparatus of a mobile robot according to another embodiment of this application.

Based on an optional embodiment provided in the embodiment shown in FIG. 13, as shown in FIG. 14, the projection module 1230 is further configured to project and display the path prompt information on the target projection plane in a first projection form.

The first projection form includes at least one of a text projection form, an image projection form, an animation projection form, and a video projection mode.

Based on an optional embodiment provided in the embodiment shown in FIG. 13, as shown in FIG. 14, the projection module 1230 is further configured to determine a projection color of the path prompt information according to a plane color of the target projection plane, the projection color being different from the plane color; and project and display the path prompt information on the target projection plane in a form of the projection color.

Based on an optional embodiment provided in the embodiment shown in FIG. 13, as shown in FIG. 14, that the projection module 1230 is further configured to project and display the path prompt information on the target projection plane in a form of the animation projection form includes: projecting and displaying the path prompt information on the target projection plane in a form of an animation guide arrow.

Based on an optional embodiment provided in the embodiment shown in FIG. 13, as shown in FIG. 14, the apparatus further includes a second determining module 1240.

The second determining module 1240 is configured to determine a projection area on the target projection plane according to a location of an obstacle, where the projection area has no overlapping area with the location of the obstacle.

The projection module 1230 is further configured to project and display the path prompt information on the projection area.

Based on an optional embodiment provided in the embodiment shown in FIG. 13, as shown in FIG. 14, the apparatus further includes: a third determining module 1250.

The third determining module 1250 is configured to determine auxiliary prompt information according to the sensing data, where the auxiliary prompt information includes an estimated arrival time and/or a movement speed of the mobile robot.

The projection module 1230 is further configured to implement the foregoing step 603.

Based on an optional embodiment provided in the embodiment shown in FIG. 13, as shown in FIG. 14, the auxiliary prompt information includes the estimated arrival time of the mobile robot; and the projection module 1230 is further configured to implement linear gradient on the projection color of the path prompt information according to the estimated arrival time of the mobile robot; and project and display, on the target projection plane, the path prompt information after the linear gradient.

The path prompt information after the linear gradient includes n color saturations in descending order of the same projection color, and the n color saturations are positively correlated to the estimated arrival time of the mobile robot.

Based on an optional embodiment provided in the embodiment shown in FIG. 13, as shown in FIG. 14, the auxiliary prompt information includes the movement speed of the mobile robot; and the projection module 1230 is further configured to determine a movement length of the mobile robot in a predetermined time period according to the movement speed of the mobile robot; and project and display the path prompt information on the target projection plane by using the movement length as a projection length of the path prompt information, where the projection length is used for indicating the movement speed of the mobile robot.

Based on an optional embodiment provided in the embodiment shown in FIG. 13, as shown in FIG. 14, the sensing data includes a first location of a moving obstacle and/or a type of a static obstacle; and the apparatus further includes: a judgment module 1260.

The judgment module 1260 is configured to perform the operation of projecting and displaying the prompt information in a case that the sensing data meets a predetermined condition The predetermined condition includes: a distance between the first location of the moving obstacle and a current location of the mobile robot is less than a predetermined threshold, and/or, the type of the static obstacle is an obstacle type meeting a visual blind spot condition.

In some embodiments, the sensing data includes at least one of a first location of a moving obstacle, a planned path of the moving obstacle, gesture information of the moving obstacle, a second location of a static obstacle, a type of the static obstacle, and the plane color of the target projection plane.

For related details, reference may be made to the method embodiments shown in FIG. 2 to FIG. 12. The obtaining module 1210 is further configured to implement any other implicit or explicit functions related to the obtaining step in the foregoing method embodiments. The first determining module 1220 is further configured to implement any other implicit or explicit functions related to the determining step in the foregoing method embodiments. The projection module 1230 is further configured to implement any other implicit or explicit functions related to the projection step in the foregoing method embodiments.

During implementation of the functions of the apparatus provided in the foregoing embodiment, the division of the foregoing functional modules is merely used as an example for description. In practical application, the foregoing functions may be allocated to and completed by different functional modules as required. That is, the internal structure of the device is divided into different functional modules to complete all or some of the functions described above. In addition, the apparatus provided in the foregoing embodiment belongs to the same conception as the method embodiment. For a specific implementation process of the apparatus, refer to the method embodiment. Details are not described herein again.

In an exemplary embodiment, a mobile robot is further provided. The mobile robot includes a processor, a memory, and a projection component. At least one instruction, at least one program segment, a code set or an instruction set is stored in the memory, where the processor, is configured to obtain sensing data, the sensing data being used for indicating an ambient environment of the mobile robot during movement;

the processor is further configured to determine path prompt information according the sensing data, the path prompt information including a planned path of the mobile robot; and the projection component is configured to project and display the path prompt information, which is determined by the processor, on a target projection plane.

In some embodiments, the projection component is further configured to project and display the path prompt information on the target projection plane in a first projection form;

where the first projection form includes at least one of a text projection form, an image projection form, an animation projection form, and a video projection mode.

In some embodiments, the projection component is further configured to determine a projection color of the path prompt information according to a plane color of the target projection plane, the projection color being different from the plane color; and project and display the path prompt information on the target projection plane in a form of the projection color.

In some embodiments, that the projection component is further configured to project and display the path prompt information on the target projection plane in an animation projection form includes: projecting and displaying the path prompt information on the target projection plane in a form of an animation guide arrow.

In some embodiments, the processor is further configured to determine a projection area on the target projection plane according to a location of an obstacle, where the projection area has no overlapping area with the location of the obstacle; and the projection component is further configured to project and display the path prompt information on the projection area.

In some embodiments, the processor is further configured to determine auxiliary prompt information according to the sensing data, where the auxiliary prompt information includes an estimated arrival time and/or a movement speed of the mobile robot; and the projection component is further configured to implement the foregoing step 603.

In some embodiments, the auxiliary prompt information includes the estimated arrival time of the mobile robot; and the projection component is further configured to implement linear gradient on the projection color of the path prompt information according to the estimated arrival time of the mobile robot; and project and display, on the target projection plane, the path prompt information after the linear gradient;

where the path prompt information after the linear gradient includes n color saturations in descending order of the same projection color, and the n color saturations are positively correlated to the estimated arrival time of the mobile robot.

In some embodiments, the auxiliary prompt information includes the movement speed of the mobile robot; and the projection component is further configured to determine a movement length of the mobile robot in a predetermined time period according to the movement speed of the mobile robot; and project and display the path prompt information on the target projection plane by using the movement length as a projection length of the path prompt information, where the projection length is used for indicating the movement speed of the mobile robot.

In some embodiments, the sensing data includes a first location of a moving obstacle and/or a type of a static obstacle; and the projection component is further configured to perform the step of projecting and displaying the prompt information in a case that the sensing data meets a predetermined condition;

where the predetermined condition includes: a distance between the first location of the moving obstacle and a current location of the mobile robot is less than a predetermined threshold, and/or, the type of the static obstacle is an obstacle type meeting a visual blind spot condition.

In some embodiments, the sensing data includes at least one of a first location of a moving obstacle, a planned path of the moving obstacle, gesture information of the moving obstacle, a second location of a static obstacle, a type of the static obstacle, and the plane color of the target projection plane.

For related details, reference may be made to the method embodiments shown in FIG. 2 to FIG. 12. The processor is further configured to implement any other implicit or explicit functions related to the processing step in the foregoing method embodiments. The projection component is further configured to implement any other implicit or explicit functions related to the projection step in the foregoing method embodiments.

The sequence numbers of the foregoing embodiments of this application are merely for the convenience of description, and do not imply the preference among the embodiments.

A person of ordinary skill in the art may understand that all or some of the steps of the interaction method of a mobile robot in the foregoing embodiments may be implemented by using hardware, or may be implemented by a program instructing relevant hardware. The program may be stored in a computer readable storage medium. The storage medium may be non-transitory computer-readable medium such as a read-only memory, a magnetic disk, an optical disc, or the like.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. An interaction method of a mobile robot, the method comprising:

obtaining, by processing circuitry of the mobile robot via a sensor, sensing data indicating an ambient environment of the mobile robot;

determining, by the processing circuitry, path indication information according to the sensing data, the path indication information including a planned path of the mobile robot; and projecting, by the processing circuitry, the path indication information on a target projection surface, a projection color of the projected path indication information being determined to be different from a color of the target projection surface on which the path indication information is projected.

2. The method according to claim 1, wherein the projecting includes:

projecting, by the processing circuitry, the path indication information on the target projection surface in a first projection form that includes at least one of a text, an image, an animation, or a video.

3. The method according to claim 1, wherein the projecting includes:

determining, by the processing circuitry, the projection color of the path indication information according to the color of the target projection surface.

4. The method according to claim 1, wherein the projecting includes:

projecting, by the processing circuitry, the path indication information on the target projection surface in a form of an animation guide arrow.

5. The method according to claim 1, before the projecting, further comprising:

determining, by the processing circuitry, a projection area on the target projection surface according to a location of an obstacle, the projection area having no overlapping area with the location of the obstacle, and the projecting includes projecting, by the processing circuitry, the path indication information on the projection area.

6. The method according to claim 1, further comprising:

determining, by the processing circuitry, auxiliary indication information according to the sensing data, the auxiliary indication information including at least one of an estimated arrival time and a movement speed of the mobile robot, and the projecting includes one of projecting, by the processing circuitry, the path indication information and the auxiliary indication information on the target projection surface, and projecting, by the processing circuitry, the path indication information on the target projection surface in a second projection form that is indicative of the auxiliary indication information.

7. The method according to claim 6, wherein when the auxiliary indication information includes the estimated arrival time of the mobile robot, the projecting includes:

projecting, by the processing circuitry and on the target projection surface, the path indication information in the projection color with a linear gradient according to the estimated arrival time of the mobile robot.

8. The method according to claim 6, wherein when the auxiliary indication information includes the movement speed of the mobile robot, the projecting includes:

determining, by the processing circuitry, a movement distance of the mobile robot in a predetermined time period according to the movement speed of the mobile robot; and projecting, by the processing circuitry, the path indication information on the target projection surface according to the movement distance.

9. The method according to claim 1, before the projecting, further comprising:

determining, by the processing circuitry, whether the sensing data meets a predetermined condition.

10. The method according to claim 1, wherein the sensing data includes at least one of a first location of a moving obstacle, a planned path of the moving obstacle, gesture information of the moving obstacle, a second location of a static obstacle, a type of the static obstacle, or a color of the target projection surface.

11. A mobile robot, comprising:

processing circuitry configured to:

obtain, via a sensor, sensing data that indicates an ambient environment of the mobile robot;

determine path indication information according to the sensing data, the path indication information including a planned path of the mobile robot; and project the path indication information on a target projection surface, a projection color of the projected path indication information being determined to be different from a color of the target projection surface on which the path indication information is projected.

12. The mobile robot according to claim 11, wherein the processing circuitry is further configured to:

project the path indication information on the target projection surface in a first projection form that includes at least one of a text, an image, an animation, or a video.

13. The method according to claim 11, wherein the processing circuitry is further configured to:

determine the projection color of the path indication information according to the color of the target projection surface.

14. The method according to claim 11, wherein the processing circuitry is further configured to:

project the path indication information on the target projection surface in a form of an animation guide arrow.

15. The method according to claim 11, wherein the processing circuitry is further configured to:

determine a projection area on the target projection surface according to a location of an obstacle, the projection area having no overlapping area with the location of the obstacle; and project the path indication information on the projection area.

16. The method according to claim 11, wherein the processing circuitry is further configured to:

determine auxiliary indication information according to the sensing data, the auxiliary indication information including at least one of an estimated arrival time and a movement speed of the mobile robot; and perform one of projecting the path indication information and the auxiliary indication information on the target projection surface, and projecting the path indication information on the target projection surface in a second projection form that is indicative of the auxiliary indication information.

17. The method according to claim 16, wherein the processing circuitry is further configured to:
when the auxiliary indication information includes the estimated arrival time of the mobile robot,
project, on the target projection surface, the path indication information in the projection color with a linear gradient according to the estimated arrival time of the mobile robot.

18. The method according to claim 16, wherein the processing circuitry is further configured to:
when the auxiliary indication information includes the movement speed of the mobile robot,
determine a movement distance of the mobile robot in a predetermined time period according to the movement speed of the mobile robot; and
project the path indication information on the target projection surface according to the movement distance.

19. The method according to claim 11, wherein the processing circuitry is further configured to:
determine whether the sensing data meets a predetermined condition.

20. A non-transitory computer-readable storage medium storing a program executable by at least one processor to perform:
obtaining, via a sensor, sensing data that indicates an ambient environment of the mobile robot;
determining path indication information according to the sensing data, the path indication information including a planned path of the mobile robot; and
projecting the path indication information on a target projection surface, a projection color of the projected path indication information being determined to be different from a color of the target projection surface on which the path indication information is projected.

* * * * *